(12) United States Patent  (10) Patent No.: US 7,962,498 B2
Bechmann  (45) Date of Patent: Jun. 14, 2011

(54) GENERATING ATTRIBUTE-SPECIFIC ELECTRONIC DOCUMENTS

(75) Inventor: Frank Bechmann, Heidelberg (DE)

(73) Assignee: SAP AG, Walldorf (DE)

( * ) Notice: Subject to any disclaimer, the term of this patent is extended or adjusted under 35 U.S.C. 154(b) by 295 days.

(21) Appl. No.: 12/345,683

(22) Filed: Dec. 30, 2008

(65) Prior Publication Data

US 2010/0169388 A1    Jul. 1, 2010

(51) Int. Cl.
*G06F 17/30* (2006.01)
*G06F 7/00* (2006.01)

(52) U.S. Cl. ......... 707/756; 707/728; 707/769; 707/944
(58) Field of Classification Search .................. None
See application file for complete search history.

(56) References Cited

U.S. PATENT DOCUMENTS

| | | | | |
|---|---|---|---|---|
| 5,600,833 | A * | 2/1997 | Senn et al. .......................... | 1/1 |
| 7,127,470 | B2 * | 10/2006 | Takeya ........................ | 707/805 |
| 7,620,641 | B2 * | 11/2009 | Nguyen et al. ........................ | 1/1 |
| 2001/0042075 | A1 * | 11/2001 | Tabuchi ........................ | 707/500 |
| 2002/0178103 | A1 * | 11/2002 | Dan et al. ........................ | 705/37 |
| 2004/0194032 | A1 * | 9/2004 | Liu et al. ........................ | 715/530 |
| 2004/0215555 | A1 * | 10/2004 | Kemper et al. ................ | 705/38 |
| 2007/0021992 | A1 * | 1/2007 | Konakalla ........................ | 705/7 |
| 2007/0101253 | A1 * | 5/2007 | Bohle ........................ | 715/507 |

OTHER PUBLICATIONS

United Nations Economic Commission for Europe; Steps to Design UNLK Trade Documents Based on the Electronic Blue Forms Design Sheet; Published: Oct. 2, 2005 (http://www.unece.org/etrades/unedocs/e_forms/UNLK.pdf).

* cited by examiner

*Primary Examiner* — Tony Mahmoudi
*Assistant Examiner* — James J Wilcox

(57) ABSTRACT

Described are methods and systems for generating an attribute-specific document for a business scenario. Attributes necessary for generating the attribute-specific document are selected. Based upon the business scenario, a global document and corresponding metadata are determined. The global document includes generic information about the business scenario. Based upon the global document and corresponding metadata, sections associated with the business scenario are determined. Based upon the attributes selected, parameters are determined to overwrite the generic information in the global document. The sections and the parameters are compiled along with the global document, to create the attribute-specific document.

15 Claims, 4 Drawing Sheets

GENERATING ATTRIBUTE-SPECIFIC ELECTRONIC DOCUMENTS

FIELD OF THE INVENTION

Embodiments of the invention generally relate to the field of content management, and more particularly they relate to methods and systems to generate attribute-specific documents.

BACKGROUND OF THE INVENTION

Enterprise content management generally relates to managing content involving digital data that may be dependent on business scenarios influenced by attributes such as industry, geography, lines of business, customers, product lines and the like. For instance, a multinational company having customers and prospects throughout the world and having a product portfolio that addresses multiple industries and branches, has to provide documentation which supports easy generation of country, industry and language specific content. The content may be marketing documents, presentations, sales pitches, cost-benefit calculations, forms, tables, files and the like. While much of the content may need to be customized to the business scenario, there is a lot of redundant content that is repeated for each of the scenarios. As a lot of redundant data is involved, the development and maintenance of content becomes wasteful. There is a need for methods and systems for reusing as much of the available content as possible and for developing the content that is specific to the business scenarios in order to minimize redundancy of development and maintenance efforts.

SUMMARY OF THE INVENTION

Described are methods and systems for generating an attribute-specific document for a business scenario. An attribute-specific document may be described as a document of a business scenario that is generated for a particular attribute. An attribute defines a feature or a characteristic that is necessary to determine the essential information to generate the attribute-specific document. One or more such attributes, necessary for generating the attribute-specific document are selected. Based upon the business scenario, a global document and corresponding metadata are determined. The global document includes generic information about the business scenario. The generic information typically does not depend upon the attribute selected, and remains unchanged for corresponding business scenario. The metadata of the global document may include information relating to the global document, like, supporting documents for the global document, technical explanations of the business scenario, etc.

Based upon the global document and corresponding metadata, one or more sections associated with the business scenario are determined. These sections are a collection of re-usable information present for each global document of each business scenario, for each attribute. Based upon the attributes selected, one or more parameters are determined to overwrite the generic information in the global document. Parameters are parts of a global document, whose content depends upon the selected attributes. The sections and the parameters are compiled along with the global document, to create the attribute-specific document.

These and other benefits and features of embodiments of the invention will be apparent upon consideration of the following description of embodiments thereof, presented in connection with the following drawings in which like reference numerals are used to identify like elements throughout.

BRIEF DESCRIPTION OF THE DRAWINGS

The claims set forth the embodiments of the invention with particularity. The embodiments of the invention, together with their advantages, may be best understood from the following detailed description taken in conjunction with the accompanying drawings. The invention is illustrated by the way of example and not by the way of limitation in the figures of the accompanying drawings. It should be noted that references to "an" or "one" embodiment in this disclosure are not necessarily to the same embodiment, and such references mean at least one.

DETAILED DESCRIPTION

Figure 1:
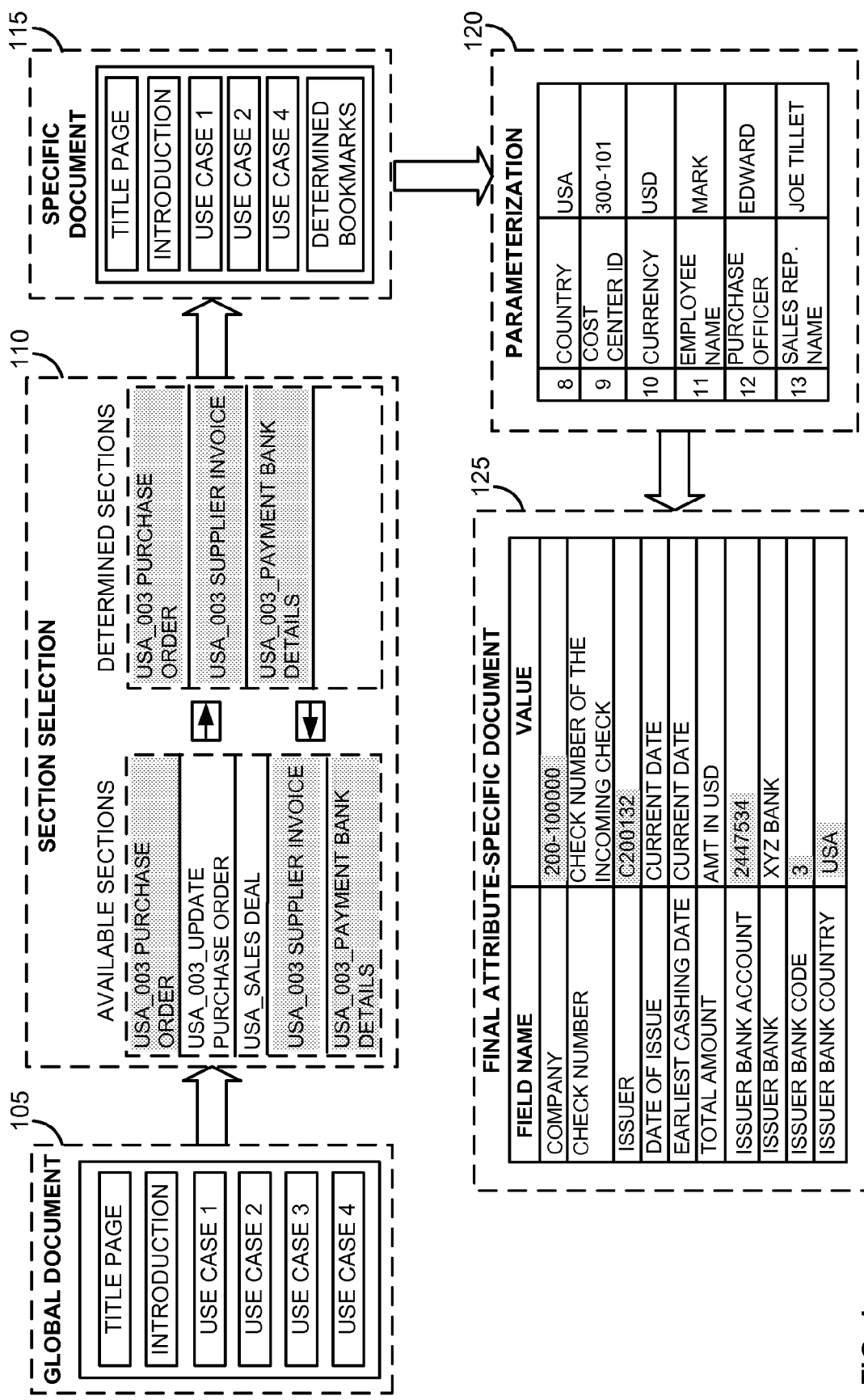
FIG. 1 is a block diagram of an exemplary process for generating an attribute-specific document for a business scenario, according to an embodiment of the invention.

The claims set forth the embodiments of the invention with particularity. The embodiments of the invention, together with their advantages, may be best understood from the following detailed description taken in conjunction with the accompanying drawings. The invention is illustrated by the way of example and not by the way of limitation in the figures of the accompanying drawings. It should be noted that references to "an" or "one" embodiment in this disclosure are not necessarily to the same embodiment, and such references mean at least one.

Described are methods and systems for generating an attribute-specific document for a business scenario. A business scenario may be described as a method in which work is carried out for some business activity related to a specific business scenario or context. For instance, a business scenario may be a set of steps involved in achieving an expected result. The activity itself may involve marketing, sales, purchasing, design, distribution, maintenance and any other activity engaged by an enterprise.

A business scenario document may contain generic information about the given business scenario including, an introduction to the given business, information regarding the steps to be followed, the order in which the steps have to occur, a collection of use cases, information about the expected result, and the like. Each use case describes a set of steps that has to be performed to accomplish an action. The business scenario document however may have some portions that do not change with the change in a business scenario and some portions that do. Business scenario or context can be defined as a collection of attributes.

An attribute defines a feature or a characteristic that is necessary to determine the essential information, to generate the attribute-specific document. For example, attributes of a business scenario may be a country, an industry, product line, a factory location, regulatory regimes and the like. Such attributes could also simply be an updated version of the business scenario or a release date of the business scenario. Based upon changes to the attributes, the business scenarios change and as a result, some of the information present in a global business scenario document may need to be made specific.

By creating such a document containing specific information of the given business scenario, various attribute-specific readers will have access to the given business scenario information, and such documents will have information that is specific to the reader for the corresponding attribute. Such a document created for specific attributes of the given business scenario may be termed as an attribute-specific document. For example, if a selected attribute is "country A", the attribute-specific document for the given business scenario is a document that is created for the "country A". An attribute-specific document may be described as a document of a business scenario that is generated for a particular attribute. One or more such attributes, necessary for generating the attribute-specific document, are selected. Based upon the selected attributes, the essential information that is used to generate the attribute-specific document is determined.

Based upon the business scenario, a global document and corresponding metadata are determined. The global document includes generic information about the business scenario. The generic information typically does not depend upon the attribute selected, and remain unchanged for corresponding business scenario. The metadata of the global document may include information relating to the global document, like, supporting documents for the global document, technical explanations of the business scenario, etc. The global document for a specific business scenario may include parts that are common throughout the given business scenario and some parts that may need to change as attributes change or some other parts that may need to be added as attributes are added to further specify a business scenario. By starting with a global document, re-using parts that do not change and making the needed changes as the business scenario changes, the process of creating an attribute-specific business scenario document can be made more efficient.

Based upon the global document and corresponding metadata, sections associated with the business scenario are determined. These sections are a collection of re-usable information present for each global document of each business scenario, for each attribute. For instance, a business scenario "Financial Management", with a global document "Financial period closing", may include sections like "Monthly check of open items receivable" and "Create balance by end of business year". The description for "Monthly check of open items receivable" may be same for all countries, and industries. However, the description for "Create balance by end of business year" may differ between countries. Here, a specific document may use the section for "Monthly check of open items receivable" from metadata of a global document containing this section, and may use a different section for "Create balance by end of business year", taken from metadata of a specific document defined for that country. Here, a specific document may be described as a document for a specific attribute. This specific document may contain all information about the corresponding attribute. Metadata of the specific document may include information supporting documents for the specific attribute, like the sections for the specific attribute.

Table 1 below, illustrates the global document, and sections present for selected attribute country.

TABLE 1

| Global Document | Specific Document | Section |
|---|---|---|
| Financial period closing | "Financial period closing" for country U.S.A | "Monthly check of open items receivable" - "Perform operation XYZ for U.S.A specification" "Create balance by end of business year" - "Create according to U.S.A specification" |
| | "Financial period closing" for country Germany | "Create annual statement" - "Create according to U.S.A specification" "Create balance by end of business year" - "Create according to Germany specification" |

If the attributes selected for a specific document is country "USA", the specific document would be: "Financial period closing" for USA, including sections: "Monthly check of open items receivable"—"Perform operation XYZ for USA specification"; and "Create balance by end of business year"—"Create according to USA specification"; and "Create annual statement"—"Create according to USA specification". Similarly, if the attributes selected for a specific document is country "Germany", the specific document would be: "Create balance by end of business year"—"Create according to Germany specification".

A section may also be described as an auxiliary document or a supporting document that is determined based upon the selected attributes. A section may contain information that is specific to the selected attribute, and adding this information to the global document would make the information in the global document complete. The section may provide additional information or additional documents that supplement the global document. The section may contain information that is not available in the global document, but is necessary to complete the given business scenario. Sections are thus parts of a business scenario, and the complete set of sections available for a business scenario describes the complete theoretical content of the corresponding business scenario. From this complete set of content, some sections may be excluded based upon the selected attribute, and some sections may be excluded by a user responsible for creating the attribute-specific document. For instance, in the above example, if the attribute value for country is "Germany", the USA—specific section "Create annual statement" will be excluded. Also, the user may select not to add the section "Monthly check of open items receivable", even if that section is also available for a "Germany" document.

Based upon the attributes selected, parameters are determined to overwrite the generic information in the global document. Parameters are parts of a global document, whose content depends upon the selected attributes. The sections and the parameters are compiled along with the global document, to create the attribute-specific document. Examples for parameters may include "Currency" or "Weight measurement", "component manufacturer", "bank details" etc. that are specific to the selected attribute. Values of these parameters include unit of the currency (for e.g., USD, EUR, INR, etc.), unit of the weight measurement (for e.g., kgs, lbs, etc.), bank details (for e.g., issuer bank, check number, cashing date, etc.). Compiling the sections and parameters along with the global document include aggregating and merging the determined sections associated with the business scenario and replacing values of the parameters present in the global document with values of parameters determined based upon the selected attributes.

In an embodiment, a combination of parameters may exist for a plurality of selected attributes. For instance, considering two attributes—country and industry, if a currency unit and a weight measurement unit have to be changed according to the country—USA, the corresponding parameter existing in the generic information of the global document is changed accordingly (for e.g.,: value of currency is changed to US DOLLAR; and value of weight measurement is changed to POUNDS). This change is made to the specific document that is specific to the country attribute USA.

The specific document including sections relevant for the global document is created, where the sections contain references of the parameter. Furthermore, the values of all parameters that are present in the specific document are determined using the attributes that are selected to create this specific document. The parameters in the specific document are replaced with the values of the parameters that are specific to the selected attribute. The process for generating an attribute-specific document for a business scenario includes determining the global document based upon the business scenario. The relevant sections are determined based upon the selected attributes. The sections are compiled with the global document to create a specific document. Based upon the attributes, parameters present in the global document are determined. Values of the parameters present in the specific document are replaced with the values determined based upon the attributes. This process of collecting and merging the relevant sections and replacing values of the parameters, is stored as a template document that is specific for the corresponding attributes and can be used later when the same scenario is encountered.

FIG. 1 is a block diagram of an exemplary process for generating an attribute-specific document for a business scenario, according to an embodiment of the invention. Global document 105 and corresponding metadata is determined for the business scenario. The global document 105 comprises generic information like title page, introduction page, use case 1, use case 2, use case 3, and use case 4. At least some of the generic information that is present in the global document 105 may be re-used for various attributes for the given business scenario. The metadata of the global document may include information relating to the global document. Attributes are selected for generating the attribute-specific document for the given business scenario. In one embodiment, a user selects the attributes based upon a business requirement. For instance, the attribute selected for the business requirement may be "country USA". Based upon a selected attribute, some of the information may have to be modified in the global document 105, like making some documents specific to the attribute, some information may not be required for the selected attribute, and some additional documents may be necessary to complete the information in the global document 105. For instance, the use cases present in the global document 105 may have to be modified, like, "use case 1" may need additional supporting documents, "use case 2" may have to be made specific to the selected attribute "country USA", "use case 3" may not be necessary for the selected attribute "country USA".

Based upon the global document and the corresponding metadata of the business scenario, one or more sections that are associated with the business scenario, are determined in section selection block 110. A section may be described as an auxiliary document or a supporting document that is determined based upon the selected attributes. A section may contain information that is specific to the selected attribute, and adding this information to the global document 105 would make the information in the global document 105 complete. The sections are a collection of re-usable information present for each global document and business scenario. The section may provide additional information or additional documents that supplement the global document 105. The section may contain information that is not available in the global document 105, but may be needed to complete the given business scenario.

Sections may be determined by selecting one or more available sections that are relevant to the given business scenario. For instance, for a given business scenario of performing a tax computation, for a selected attribute "country A", the available sections may include "tax document", "tax regulations of country A", "tax payer citizenship details", "tax payer VISA type", "tax payer identification document", "tax payer election identification document", "tax payer passport document", "tax payer property related documents", and the like. The determined sections may include documents that are relevant and that are necessary for the selected attribute and the business scenario, like "tax document", "tax payer citizenship details", "tax payer property related documents", and the like, that are specific to "country A". The available sections may be stored in a section repository and presented as choices for a user to select based on the business scenario. The section selection block 110 determines available sections for the business scenario that are relevant for the selected attributes and compiles this information to create a specific document. In an embodiment, a user may determine one or more sections from a list of available sections for the business scenario.

For instance, based upon the selected attribute "country USA", the sections determined may include "USA_003 purchase order", "USA_003 supplier invoice" and "USA_003 payment bank details" that are specific to "country USA". Specific document 115 may be created based upon the determined sections in section selection block 110. Specific document 115 is a document that is created for a specific attribute. Specific document 115 may be saved in a memory or as a template, such that the specific document 115 may be directly used based upon a selection of similar attributes, for the same business scenario. Specific document 115 may include the necessary use case and the corresponding sections, like the uses cases, "title page", "introduction", "use case 1", "use case 2", "use case 4", and the determined sections "USA_003 purchase order", "USA_003 supplier invoice" and "USA_003 payment bank details". For the given business scenario with selected attribute "country USA", this specific document 115 acts as a template.

Based upon the selected attributes, parameters are determined, for overwriting the generic information in the global document 105. A parameter may be described as a part of global document 105, whose content depends upon the selected attributes. Based upon a change in the selected attribute, the parameter has to be correspondingly changed. Once the parameters that have to be essentially changed are determined, the values of the determined parameters overwrite the values of the parameters that previously existed in the global document 105. Determining parameters may be addressed as parameterization 120. Parameters are quantities that are specific to the selected attribute. For the selected attribute "country USA", parameters generated may include "currency USD", "employee name MARK", "cost center ID 300-101", "sales representative name JOE", "issuer bank account 2447534", "issuer C200132", and the like.

In an embodiment, based upon the information in specific document 115, one or more parameters may be determined. Selection of attributes may have an impact on the contents of the global document, and in turn impact the available sections for the given business scenario. The global document 105 has now been changed to include sections that are necessary for the business scenario. The selection of the attribute may also have an impact on the parameters that have to be determined, and the values of the quantities that are overwritten with the values of the determined parameters.

The determined parameters and the determined sections are compiled along with global document 105, to generate attribute-specific document 125. Attribute-specific document 125 is generated by re-using the information that was common for all attributes for the business scenario and supplementing additional information (e.g., sections and parameters) that is needed for the selected attribute. The final document that is the attribute-specific document 125 includes information acquired from global document 105, information acquired from section selection 110, and parameters acquired from parameterization 120, and all the information is now specific to the selected attribute.

There may exist a dependency between the determined sections and the global document 105 of the given business scenario. This relation may be used to determine the most specific sections from a set of sections that may include generic auxiliary document and specific auxiliary documents with reference to the selected attributes. A generic auxiliary document may contain information that may not be relevant to the attribute selected. For example, if the attributes selected are "country A" and "industry XYZ", the most generic auxiliary documents may include information about "country A", for all industries. Similarly, the most specific auxiliary document may include information about "country A" for a specific "industry XYZ". In an embodiment, a section reader may parse a section repository from the most generic to the most specific auxiliary documents, to retrieve the most specific sections from a set of sections available for the selected attributes.

In an embodiment, the global document 105 may be a part of a hierarchical set of documents. A hierarchical set of documents may be described as a group of documents, defining the maximum theoretical content for one business scenario, that are prioritized according to some criteria. The criteria that is used to decide the priorities of the documents may be order of occurrence of the documents in a business scenario, a document that is necessary to initiate the business scenario, a master document that has one or more sub-documents depending on it, and the like. For instance, a hierarchical set of documents may include five documents D1, D2, D3, D4, D5 occurring in the order "D2, D3, D1, D5, D4". This order may be derived from criteria that are defined for the five documents. In such cases, a dependency may exist between the documents in the hierarchical set of documents. The dependency may be interlinked between the documents such that, for D5 to exist, D2, D3 and D1 have to be present and so on. If global document 105 occurs in the third place in the above order, global document 105 may have a dependency on the two documents that occur prior to it. In such cases, corresponding sections of the dependent global documents may be accompanied with one or more auxiliary documents, where the auxiliary documents represent the dependency that exists between the auxiliary documents and the dependent global document. The parameters may have to be determined considering any such auxiliary document that is present.

In an embodiment, additional information may be required for generating attribute-specific document 125. This additional information may include mandatory documents that have to accompany the determined sections, auxiliary sections that may act as supporting documents to the determined sections, and the like. Such additional information may be stored in a metadata file, and the metadata file may be accessed after the sections are determined. Based upon the determined sections, the metadata file may determine mandatory documents and auxiliary sections that are necessary for the determined sections, for generating attribute-specific document 125. The determined mandatory documents and/or auxiliary documents may also be appended to the global document 105, to create specific document 115.

In an embodiment, if an error has been identified and fixed in an attribute-specific document 125 generated from a global document 105, the metadata file may contain such information about the error correction. Such information may be provided in the future, when the same global document 105 is selected for a different attribute. Based upon the error correction information available in the metadata file, necessary changes can be made to the global document 105. In an embodiment, the error corrections are stored as auxiliary documents in the metadata file, and these error correction documents can be appended to the global document 105, to create specific document 115. By utilizing the error correction, the same error that may occur during the process of generation of attribute-specific document 125, can be avoided.

Figure 2:
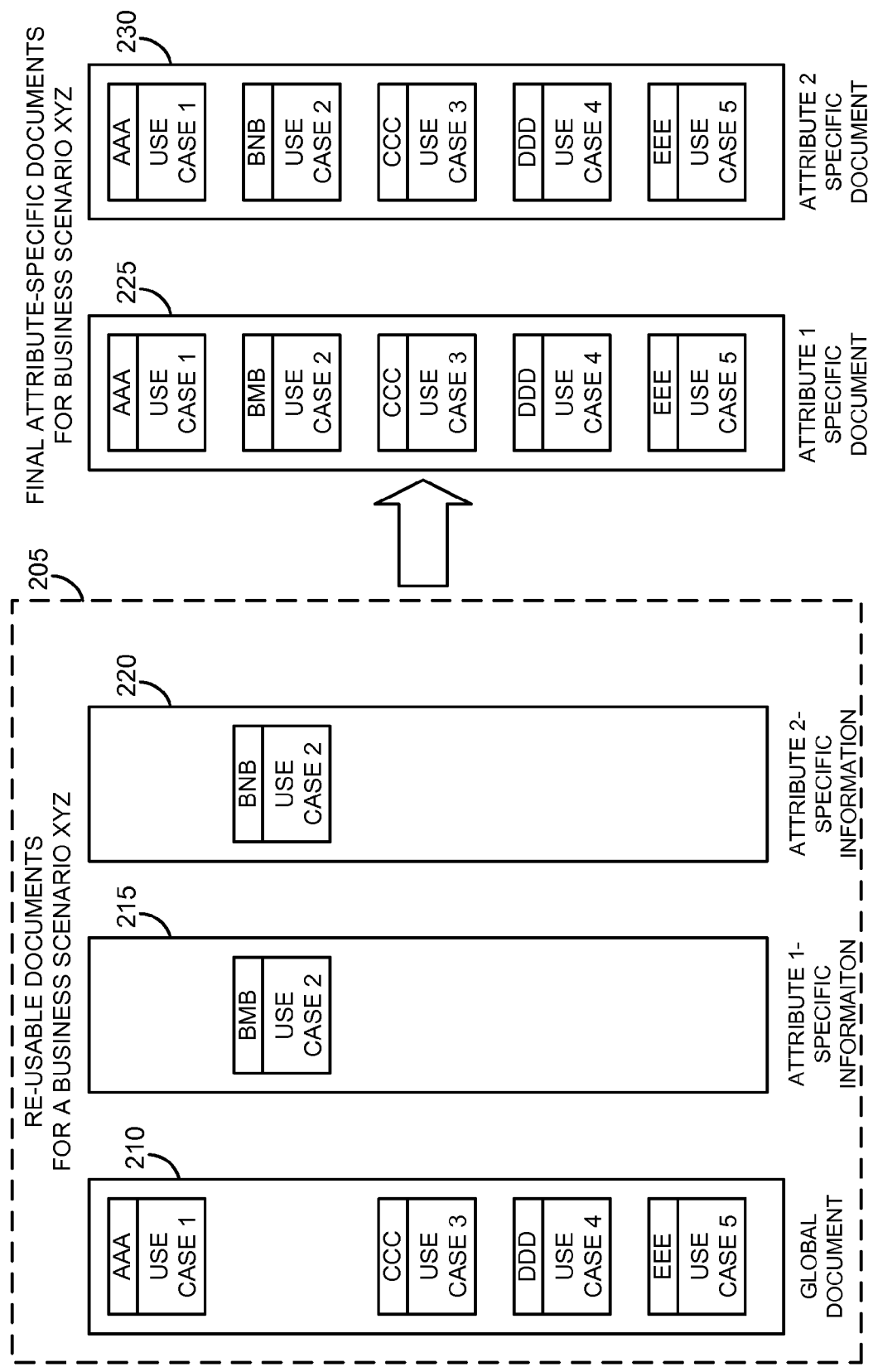
FIG. 2 is a block diagram illustrating contents involved in the process for generating an attribute-specific document for a business scenario, according to an embodiment of the invention.

FIG. 2 is a block illustrating a process of generating attribute-specific documents 225 and 230 for a business scenario XYZ, according to an embodiment of the invention. Block 205 illustrates a reusable document that is involved for the business scenario XYZ. The reusable document 205 includes a global document 210, having four use cases AAA, CCC, DDD, and EEE that are common for the business scenario XYZ. For the business scenario XYZ, the attributes selected are "ATTRIBUTE 1" and "ATTRIBUTE 2". Based upon the global document, sections associated with the business scenario are determined. Based upon the selected attributes, parameters are determined to overwrite the generic information in the global document. The parameters may also overwrite the information available in the determined sections.

The documents including the determined sections and the necessary parameters may be represented as attribute-specific information (e.g., attribute-1 specific information 215, and attribute-2 specific information 220). For instance, use case associated with attribute-1 specific information 215 is BMB, and use case associated with attribute-2 specific information 220 is BNB. In an embodiment, based upon an existence of an additional document (e.g., mandatory document or an auxiliary section), the attribute-specific information is appended with such an additional document. The attribute-specific information is merged with the global document 210, to create the attribute-specific document (e.g., attribute-1 specific document 225, attribute-2 specific document 230). Now, attribute-1 specific document 225 has use cases AAA, BMB, CCC, DDD and EEE; and attribute-2 specific document 230 has use cases AAA, BNB, CCC, DDD and EEE.

Figure 3:
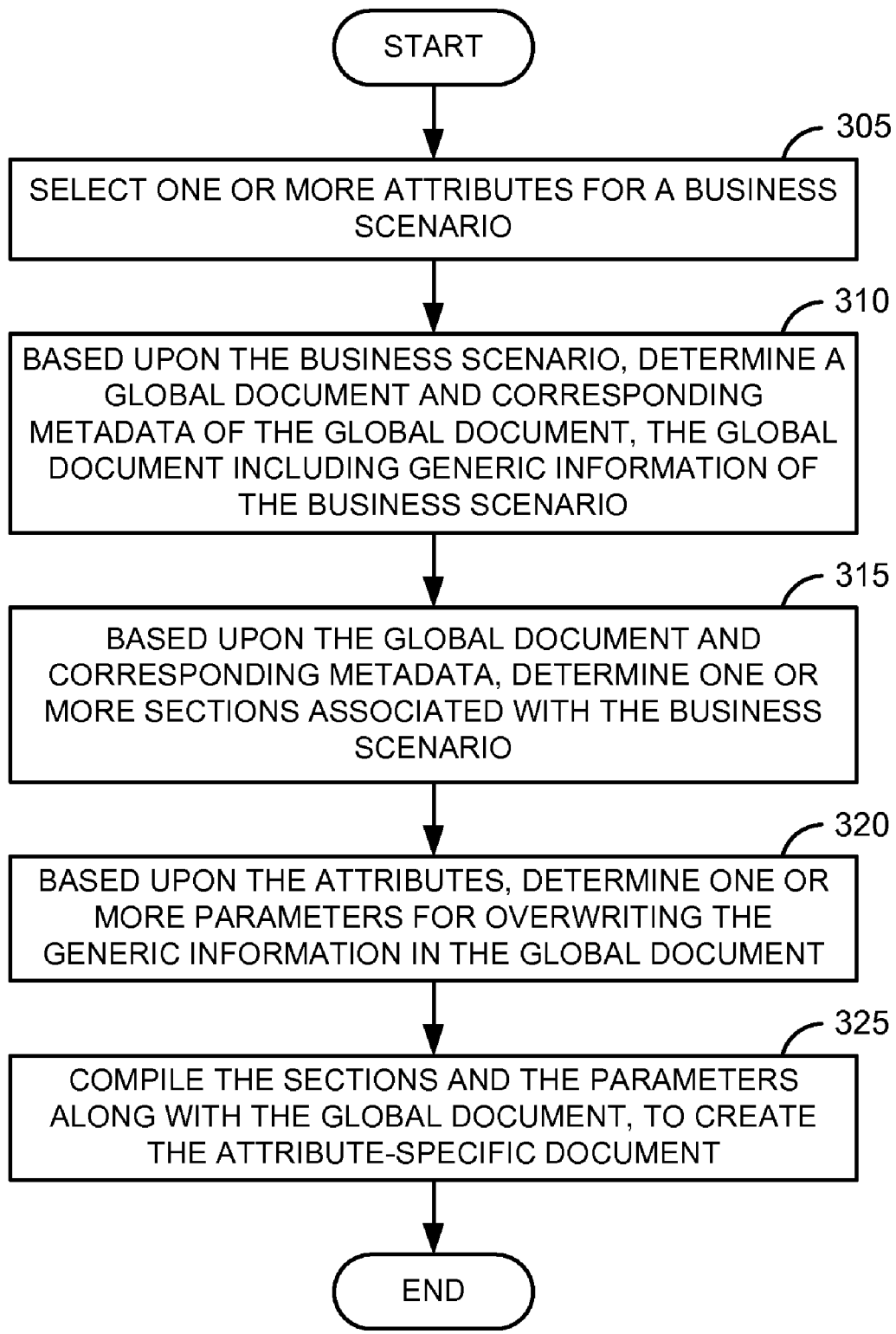
FIG. 3 is a flow diagram of an exemplary method for generating an attribute-specific document for a business scenario, according to another embodiment of the invention.

FIG. 3 is a flow diagram of an exemplary method for generating an attribute-specific document for a business scenario, according to another embodiment of the invention. In process block 305, attributes are selected for generating the attribute-specific document, based upon available attributes for the business scenario. In process block 310, based upon the business scenario, a global document and corresponding metadata of the global document, having generic information about the business scenario is selected.

In process block 315, based upon the global document and the corresponding metadata, sections associated with the business scenario are determined. The sections may be determined from a list of one or more available sections that are relevant for the business scenario. In an embodiment, the available sections may be parsed to determine a set of one or more relevant sections that are specific to the business scenario and/or the attributes selected. In process block 320, based upon the selected attributes, parameters are determined, for overwriting the generic information in the global document. The parameters may also overwrite the information present in the section to make the information attribute-specific. In process block 325, the sections and the parameters are compiled along with the global document, to create the attribute-specific document.

Figure 4:
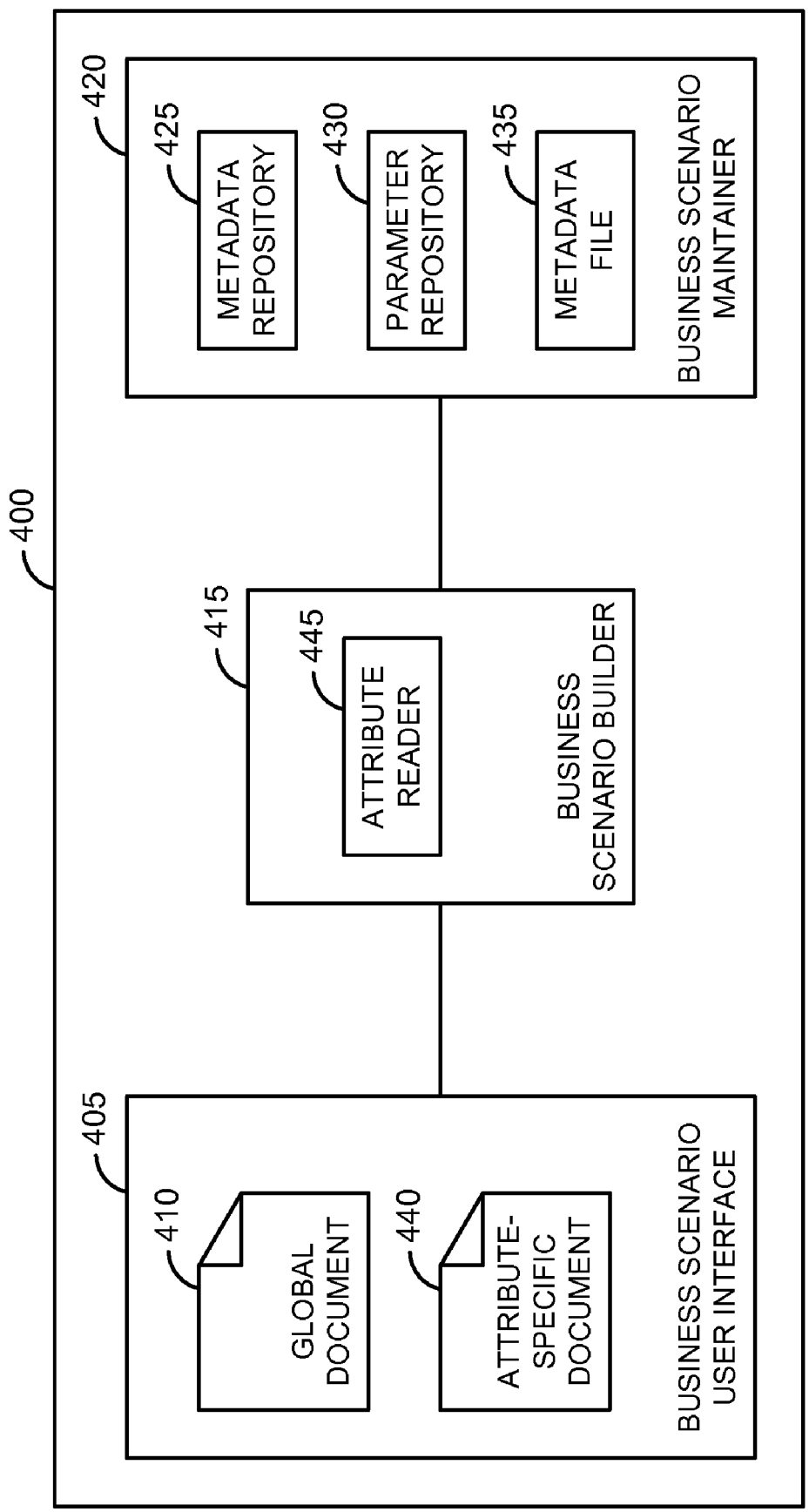
FIG. 4 is a block diagram of an exemplary system for generating an attribute-specific document for a business scenario, according to an embodiment of the invention.

FIG. 4 is a block diagram of an exemplary system for generating an attribute-specific document for a business scenario, according to an embodiment of the invention. System 400 includes business scenario user interface 405, business scenario builder 415 including attribute reader 445, business scenario maintainer 420 having metadata repository 425, parameter repository 430 and metadata file 435. According to an embodiment, business scenario user interface 405 is in communication with business scenario builder 415. Business scenario builder 415 is in communication with business scenario maintainer 420.

Business scenario user interface 405 may be used to display global document 410. Global document 410 is a re-usable document containing generic information about the business scenario. One or more attributes are selected for generating attribute-specific document 440, based upon the available attributes for the business scenario. Attribute reader 445 present in business scenario builder 415 determines the attribute selection performed on the attributes.

Based upon the global document 410 and corresponding metadata of the global document 410, business scenario builder 415 determines necessary sections from metadata repository 425, to generate the attribute-specific document 440. Based upon the selected attributes, business scenario builder 415 determines necessary parameters from parameter repository 430, for overwriting generic information present in global document 410. Business scenario builder 415 compiles the attribute-specific information from the sections and the parameters, to create attribute-specific document 440.

In an embodiment, business scenario builder 415 may merge the sections and the parameters with global document 410, to generate attribute-specific document 440. In another embodiment, business scenario builder 415 may read an existing specific document having the sections and the reusable information of the global document 410 for the given business scenario and the selected attribute. Based upon such a specific document, the parameters may be determined from parameter repository 430.

In an embodiment, additional information may be necessary for generating the attribute-specific document 440. This additional information may include mandatory documents that have to go with the determined sections, auxiliary sections that may act as supporting documents to the determined sections, and the like. Such additional information may be stored in metadata file 435, and metadata file 435 may be accessed after the sections are determined. Based upon the determined sections, business scenario builder 415 determines mandatory documents and auxiliary sections present in metadata file 435 that may be necessary for the determined sections. The determined mandatory documents and/or auxiliary documents may also be appended to the global document 410 to create attribute-specific document 440.

In another embodiment, metadata file 435 may be used for determining a specific document and/or an attribute-specific document, that may be available for a given business scenario and a given attribute. Metadata file 435 may store the specific document and/or the attribute-specific document for future use.

Embodiments of the present invention may also be provided as a tangible machine-readable medium for storing the machine-executable instructions. The tangible CD-ROMs, DVD ROMs, RAMs, EPROMs, EEPROMs, magnetic or optical cards, or any other type of machine-readable media suitable for tangibly storing electronic instructions. The machine readable medium can provide the instructions stored therein to a computer system comprising a processor capable of reading and executing the instructions to implement the method steps described herein.

It should be appreciated that reference throughout this specification to one embodiment or an embodiment means that a particular feature, structure or characteristic described in connection with the embodiment is included in at least one embodiment of the present invention. These references are not necessarily all referring to the same embodiment. Furthermore, the particular features, structures or characteristics may be combined as suitable in one or more embodiments of the invention.

Throughout the foregoing description, for the purposes of explanation, numerous specific details were set forth in order to provide a thorough understanding of the invention. It will be apparent, however, to one skilled in the art that the invention may be practiced without some of these specific details. The detailed description as set forth above includes descriptions of method steps. However, one skilled in the art will understand that the order of the steps set forth above is meant for the purposes of illustration only and the claimed invention is not meant to be limited only to the specific order in which the steps are set forth. Accordingly, the scope and spirit of the invention should be judged in terms of the claims which follow.

The invention claimed is:

1. A computer implemented method for generating an attribute-specific electronic document for a business scenario, the method comprising:
   receiving a selection of one or more attributes for the business scenario, wherein the attributes describe one or more characteristics for generating the attribute-specific document;
   determining a global document and corresponding metadata associated with the business scenario, wherein the global document includes generic information and one or more parameters of the business scenario;
   determining one or more sections of reusable information available for the global document, based upon the selected attributes;
   converting the global document into a specific document based upon the selected attributes, wherein the specific document includes the sections of reusable information, the generic information and the parameters;
   parameterizing the specific document by determining the parameters associated with the attributes; and
   overwriting one or more values of the parameters in the specific document with one or more values associated with the attributes and compiling the specific document, to create the attribute-specific document.

2. The computer implemented method of claim 1, wherein the sections are determined by a user.

3. The computer implemented method of claim 1, further comprising:
   determining one or more auxiliary sections based upon the attributes; and
   determining one or more mandatory sections based upon the attributes.

4. The computer implemented method of claim 3, wherein the auxiliary sections and the mandatory sections are appended to the determined sections.

5. The computer implemented method of claim 3, wherein the auxiliary sections and the mandatory sections are retrieved from a metadata file.

6. The computer implemented method of claim 3, wherein the auxiliary sections are determined based upon a dependency with the determined sections.

7. The computer implemented method of claim 1, wherein the specific document is stored as a template.

8. The computer implemented method of claim 1, wherein the global document exists in a hierarchical set of documents.

9. The computer implemented method of claim 8, further comprising determining the parameters based upon a dependency that exists between one or more documents in the hierarchical set of documents and the global document.

10. The computer implemented method of claim 1, further comprising determining the parameters based upon the selected sections.

11. The computer implemented method of claim 1, wherein the metadata of the global document comprises the sections of reusable information associated with the business scenario.

12. An article of manufacture, comprising machine readable instructions which when executed by a machine causes the machine to execute a method for generating an attribute-specific document for a business scenario, the method comprising:
    receiving a selection of one or more attributes for the business scenario, wherein the attributes describe one or more characteristics for generating the attribute-specific document;
    determining a global document and corresponding metadata associated with the business scenario, wherein the global document includes generic information and one or more parameters of the business scenario;
    determining one or more sections of reusable information available for the global document, based upon the selected attributes;
    converting the global document into a specific document based upon the selected attributes, wherein the specific document includes the sections of reusable information, the generic information and the parameters;
    parameterizing the specific document by determining the parameters associated with the attributes; and
    overwriting one or more values of the parameters in the specific document with one or more values associated with the attributes and compiling the specific document, to create the attribute-specific document.

13. A computer system for generating an attribute-specific document for a business scenario comprising:
    a processor operable for reading and executing instructions stored in one or more memory elements; and
    the one or more memory elements storing instructions related to:
        an attribute reader for reading and receiving an attribute selection performed on one or more attributes, wherein the attributes describe one or more characteristics for generating the attribute-specific document;
        a metadata repository in communication with the attribute reader, for
            storing a global document and corresponding metadata associated with the business scenario, wherein the global document includes generic information and one or more parameters of the business scenario,
            storing one or more sections of reusable information available for the business scenario determined based upon the selected attributes, and
            storing a specific document that is created based upon the attributes, wherein the specific document includes the sections of reusable information, the generic information and the parameters;
        a parameter repository in communication with the metadata repository and the attribute reader, for storing a parameterized specific document
        a business scenario builder for
            determining the global document and corresponding metadata associated with the business scenario,
            determining the one or more sections of reusable information available for the global documents, based upon the selected attributes,
            parameterizing the specific document by determining the parameters associated with the attributes and
            overwriting one or more values of the parameters in the specific documents with one or more values associated with the attributes and compiling the specific document to create the attribute-specific document.

14. The computer system of claim 13, further comprising a metadata file for determining and storing one or more auxiliary sections and one or more mandatory sections, based upon the attributes.

15. The computer system of claim 14, wherein the metadata file determines a specific document available for a given business scenario and a given attribute.

* * * * *